United States Patent
Schädle

[11] Patent Number: 5,666,877
[45] Date of Patent: Sep. 16, 1997

[54] PEELING DEVICE

[76] Inventor: Erwin Schädle, Dorfenstrasse 24, 85454 Schwaig, Oberding, Germany

[21] Appl. No.: 549,730

[22] PCT Filed: Mar. 1, 1995

[86] PCT No.: PCT/EP95/00743

§ 371 Date: Nov. 15, 1995

§ 102(e) Date: Nov. 15, 1995

[87] PCT Pub. No.: WO95/24850

PCT Pub. Date: Sep. 21, 1995

[30] Foreign Application Priority Data

Mar. 15, 1994 [AT] Austria ................................. 557/94

[51] Int. Cl.$^6$ ............................ A23N 7/00; A47J 17/00
[52] U.S. Cl. .......................... 99/588; 99/593; 99/591; 99/590
[58] Field of Search .......................... 99/588, 590, 591, 99/593, 597, 598, 542, 584, 589; 30/123.7, 123.6, 123.5

[56] References Cited

U.S. PATENT DOCUMENTS 4,038,915  8/1977  Saito ................................ 99/594
5,230,155  7/1993  Pai ................................. 30/277.4

FOREIGN PATENT DOCUMENTS 1 288 257   1/1969   Germany.
2 258 126   5/1974   Germany.
9415688 U   1/1995   Germany.
2 244 208  11/1991   United Kingdom.

*Primary Examiner*—Reginald Alexander
*Attorney, Agent, or Firm*—Cushman, Darby & Cushman IP Group of Pillsbury Madison & Sutro LLP

[57] ABSTRACT

A peeling device for fruits has a housing (1) with a knife opening (16) in the surface (18) for a peeling knife (15) with a knife-edge (17) that projects above the top side (18) of the lid (4). The peeling knife (15) is connected to an oscillating arm (13) that protrudes through an opening (14) in the container (1) and connects to an electrical drive unit (8) that is located in a housing (5) that is connected to the side of the container (1). The position of the electrical drive unit (8) in the housing (5) and consequently the length by which the knife-edge (17) projects above the surface (18) of the container lid (4) is adjustable via a worm gear (11) with a thumb screw (12). A fruit shown as a circle (19) is peeled by the oscillating movements of the knife (15) while being moved along the surface (18) of the lid (4).

16 Claims, 4 Drawing Sheets

PEELING DEVICE

BACKGROUND OF THE INVENTION

1. Field of the Invention

The invention pertains to a peeling device for fruits comprising a peeling knife whose knife-edge can be moved along the fruit surface for peeling.

2. Description of the Related Art

The term "fruits" is defined as foods with surfaces that can be peeled, especially vegetables such as beets, carrots, horse-radish, potatoes, turnips, asparagus, etc., and fruits such as apples, pears, tropical fruits, etc.

In the past, the fruits were peeled mostly by hand using a knife, an arduous process that requires much labor and time.

SUMMARY OF THE INVENTION

The purpose of the present invention is to provide a peeling device with a drive unit and with easy handling to allow quick peeling of fruits. The proposed means for attaining the objective of the invention is to provide a preferably electrical drive unit with a drive arm that is located below the support surface of the fruits to be peeled and that oscillates the attached peeling knife, and by having the peeling knife reach through a knife opening in the support surface with the knife-edge projecting above the support surface.

Accordingly, the peeling knife of the invented peeling device is oscillated by the oscillating arm. Preferably, the oscillating arm has an electrical drive that may be similar to an electric razor drive with an oscillating head, or with a rotating electric motor with an eccentric. However, it is also possible to use other drives such as a water turbine that is connected by hose to the water line, and that may for example be advantageous if no electricity is available.

If the fruit is moved over the support surface by hand for peeling, the knife-edge that projects through the support surface cuts into the fruit surface and removes a portion of it which results in peeling. The fruit is just moved through a series of different positions over the support surface until it is completely peeled.

It has been shown to be advantageous if the support surface is designed as a container lid that has preferably several openings to pass the peels. Said container provides a stable stand for the support surface and accommodates the oscillating arm under the support surface. The container can also accommodate the peels generated by the peeling knife during the peeling process and can be easily emptied.

The fruits to be peeled have almost always roughly the shape of a truncated cone, a cylinder or sphere. The invention features a curved support surface and/or at least two planes at an angle in the area of the knife opening as well as a knife-edge that is shaped to match the shape of the support surface, in order for the knife-edge to peel the largest possible fruit surface area at a given fruit position on the support surface in one pass.

The invented peeling device can be efficiently utilized with fruits of different size and/or shape if for example several container lids are made available that feature various surfaces and matching peeling knives attached to the oscillating arm and that are used for peeling according to the shape of the fruit.

It is advantageous, if the peeling thickness is adjustable dependent on the fruits to be peeled and on the subsequent use of the fruits. For this purpose, the invention provides an adjustment for the gap between the knife-edge and the support surface. The peel thickness increases with the gap size.

Furthermore, it is useful if the oscillating arm is detachable from the drive unit. It allows easier cleaning of the oscillating arm and of the attached peeling knife without having to expose the drive unit to water which would be dangerous, especially with electric drive units, and it makes it easy to use oscillating arms with peeling knives of various shapes.

The drive unit is preferably designed with a housing that is attached on the side of the container, and that can preferably be pivoted on an axis or is detachable, and said container has a wall opening for the oscillating arm to reach through. This allows for a safe arrangement of the drive unit outside of the container and assures also the required positioning of the oscillating arm and peeling knife underneath of the support surface. The pivoting or detachable connection of the drive housing to the container wall does not only save space when the invented device is stored but allows furthermore the cleaning of the container with water without exposing the drive unit to water.

The desired adjustment of the gap between the knife-edge and the support surface can for example be achieved using a worm gear to adjust the elevation of the drive unit in the housing via a thumb screw on the side of the housing. The elevation adjustment of the drive unit changes the position of the attached oscillating arm and thus also of the peeling knife relative to the support surface.

Another feature of the invention comprises a container having a top part with the drive housing and a bottom part. The bottom part collects the peels that arrive through the opening in the container lid. The bottom part can be easily detached and for example be cleaned in a dishwasher.

A pivoting or removable steady leg may be provided at the housing on the side opposite to the container to securely support the drive unit housing that is connected to the container side and that is subject to vibrations due to the oscillations passed to the oscillating arm from the drive unit. The pivoting or removable steady leg for the housing together with the pivoting or removable housing described above can keep the storage space requirements of the invented peeling device small.

BRIEF DESCRIPTION OF THE DRAWINGS

Below, the invention is explained in Detail using design examples in connection with the drawing. They show.

DESCRIPTION OF THE PREFERRED EMBODIMENTS

Figure 1:
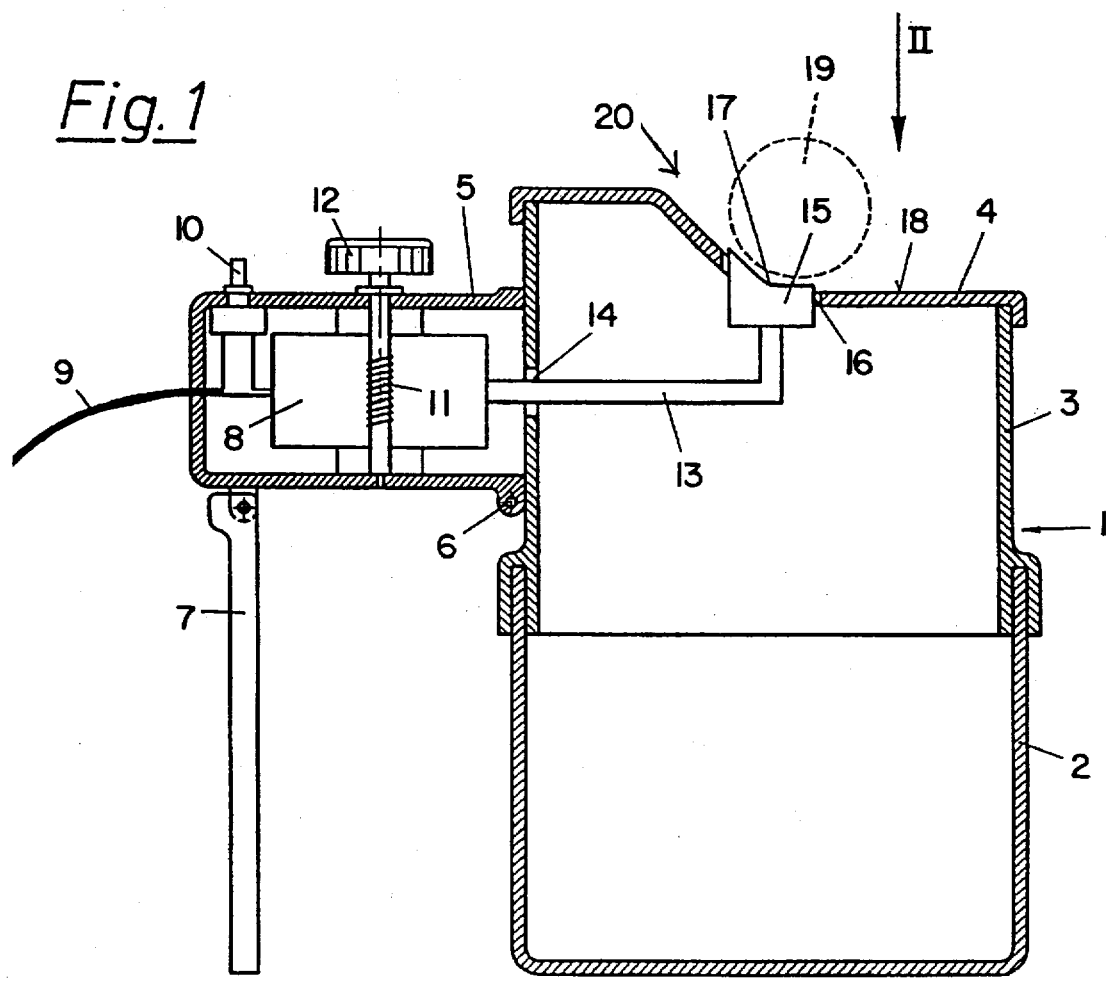
FIG. 1 a schematic section view of the peeling device representing the first design example of the invention.

The invented peeling device has a container 1 that comprises a bottom part 2, a detachable top part 3 that is connected to the bottom part and is secured against rotation, and a detachable lid 4 that is connected to the top part and is secured against rotation. The housing 5 is connected to the top part 3 of the container either by a pivot pin 6 or in a detachable fashion. In addition, the housing 5 is supported by a pivoting or detachable steady leg 7 that is connected to the housing 5 on the side opposite to the top part 3 of the container. The housing 5 contains an electric drive unit 8 that has an oscillating head similar to an electric razor. The electricity to the electrical drive unit 8 is supplied by a cable 9. The housing 5 has also a switch 10 to switch the electric drive unit on and off.

The elevation of the electric drive unit 8 in the housing 5 is adjustable via a worm gear 11 that is driven by a thumb screw 12 on the outside of the housing.

The oscillating head has a detachable oscillating arm 13 that protrudes into the container through the opening 14 in the top part 3 of the container, and said oscillating arm carries a peeling knife at its 90° offset end that reaches through the knife opening 16 in the lid 4, with its knife-edge 17 projecting above the surface 18 of the lid 4 that forms the support surface for the fruit to be peeled. The projection of the knife-edge 17 above the lid surface 18 is adjustable via the worm gear 11 that is driven by the thumb screw 12.

FIG. 1 shows that the surface 18 in the area of the knife opening 16 of the lid 4 consists of two planes that are connected at an obtuse angle. However, the surface may also be a curved design. The shape of the knife-edge 17 matches the shape of the surface 18. This permits peeling of a larger area of fruits of usually circular cross section in one pass.

Figure 2:
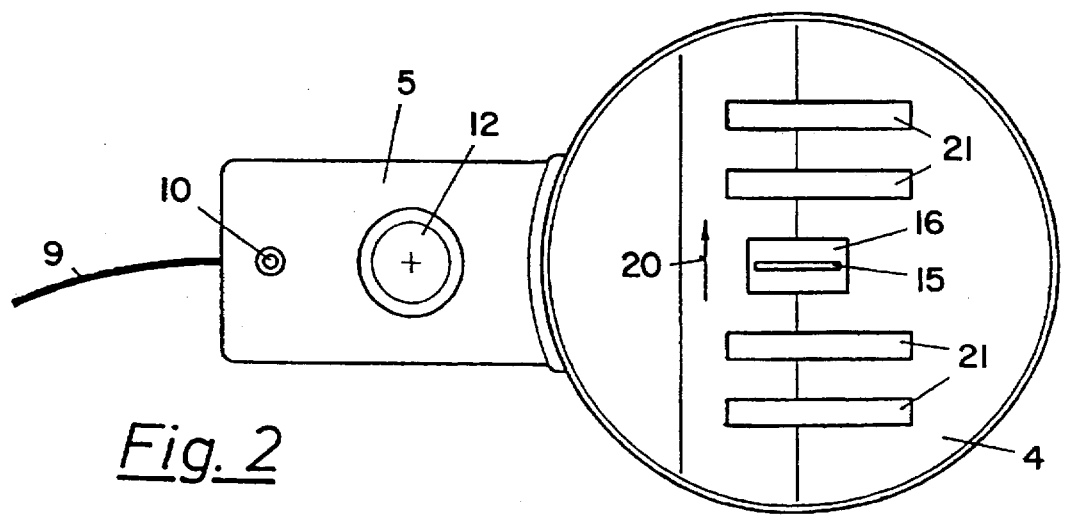
FIG. 2 a top view of the peeling device of FIG. 1 as seen in the direction of arrow II of FIG. 1.

The cross section of a fruit to be peeled such as a carrot is shown in FIG. 1 by the dashed circle 19. Peeling occurs if the fruit is moved by hand across the knife-edge 17 of the peeling knife 15 in the direction of the arrow 20 of FIG. 2. The peel thickness is determined by the size of the projection of the knife-edge 17 above the lid surface 18. The peels fall through the openings 21 into the bottom part 2 of the container that can be cleaned after lifting off the upper part 3.

Figure 3:
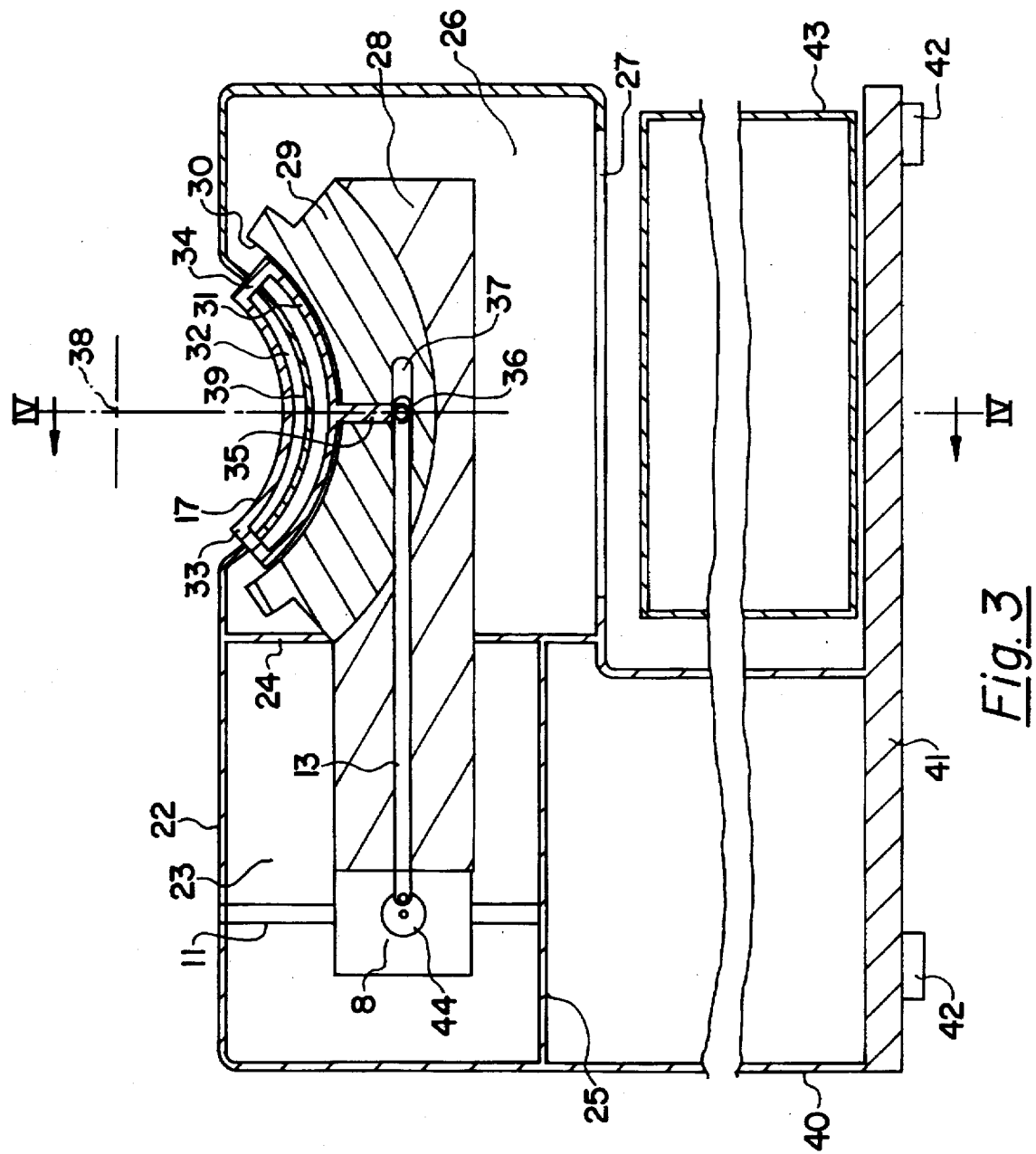
FIG. 3 a schematic section view of the peeling device representing a second design example of the invention.

The design example of FIG. 3 shows a peeling machine that is completely contained in a housing 22 that may be made of plastic. The housing 22 has a compartment 23 for the drive unit 8, with the oscillating arm 13 reaching through the partition 24. The compartment 23 is separated by another partition 25 from the stand 40. The partition 24 creates another compartment 26 in the housing 22 to accommodate the knife unit. This compartment has an opening 27 at the bottom to allow the peels and other chips to fall through. A support member 28 carrying the knife guide 29 reaches through the partition 24. The knife guide 29 has a circular guide surface 30 that acts as sliding guide surface for the knife 17. The knife base 31 of the knife is also circular and is supported by the guide surface 30. Two bridges 33 and 34 hold the knife-edge 17 at a distance from the knife base 31 and create a gap 32 between the edge 17 and the knife base 31. The peel cuttings generated by the knife-edge 17 slide through this gap 32 and pass on the sides of the support member 28 and the knife guide 29 through the opening 27 out of the compartment 26.

A driver 35 is either attached to or an integral part of the knife base 31 and points essentially downward perpendicularly with its axis extending through the center 38 of the circle. The center 38 of the circle is also the center of the circular knife-edge segment 17, the knife base 31, and of the guide surface 30. The end of the driver 35 is joined to the oscillating arm 13 with a wrist pin 36. The oscillating arm 13 moves essentially along its axis in a back and forth motion and causes the knife to slide along the guide surface 30 in a circular oscillation. The center of this circle is also the center 38. This motion is made possible through a slot 37 in the knife guide 29.

The oscillating arm 13 may be driven by an oscillating armature. But the drive unit may also be designed as a rotating electric motor where the oscillating arm 13 is connected to the motor 8 via an eccentric. Of course, the other drive options mentioned above are appropriate also.

The housing has an opening that is accessible from the top and that holds the knife. The knife-edge 17 projects at least on one side above this opening as will be explained in more detail in conjunction with FIG. 4. The size of the projection is adjustable with a mechanism, e.g., a worm gear, that allows to vertically reposition basically the complete knife unit consisting of the support member 28, the knife guide 29 and the knife. It is advantageous to reposition the motor 8 also, as for example in the present example where the motor and the support member 28 are firmly connected.

A base 41 with pads 42 is attached to the said stand 40 for placement on a table. Both compartments 23 and 26, the stand 40 and the base 41 form a C-shaped frame, wherein the bay formed by the C, that is the space between the compartment 26 and the base 41, holds a collecting dish 43 underneath the opening 27 to receive the cut peels. The present design example has fully separated compartments 23 and 26 which allows to clean the cutting tool without difficulty and does not allow water to penetrate into compartment 23.

Last, FIG. 3 shows that the housing has a trough 39 in the knife area for guiding the fruits to be peeled.

Figure 4:
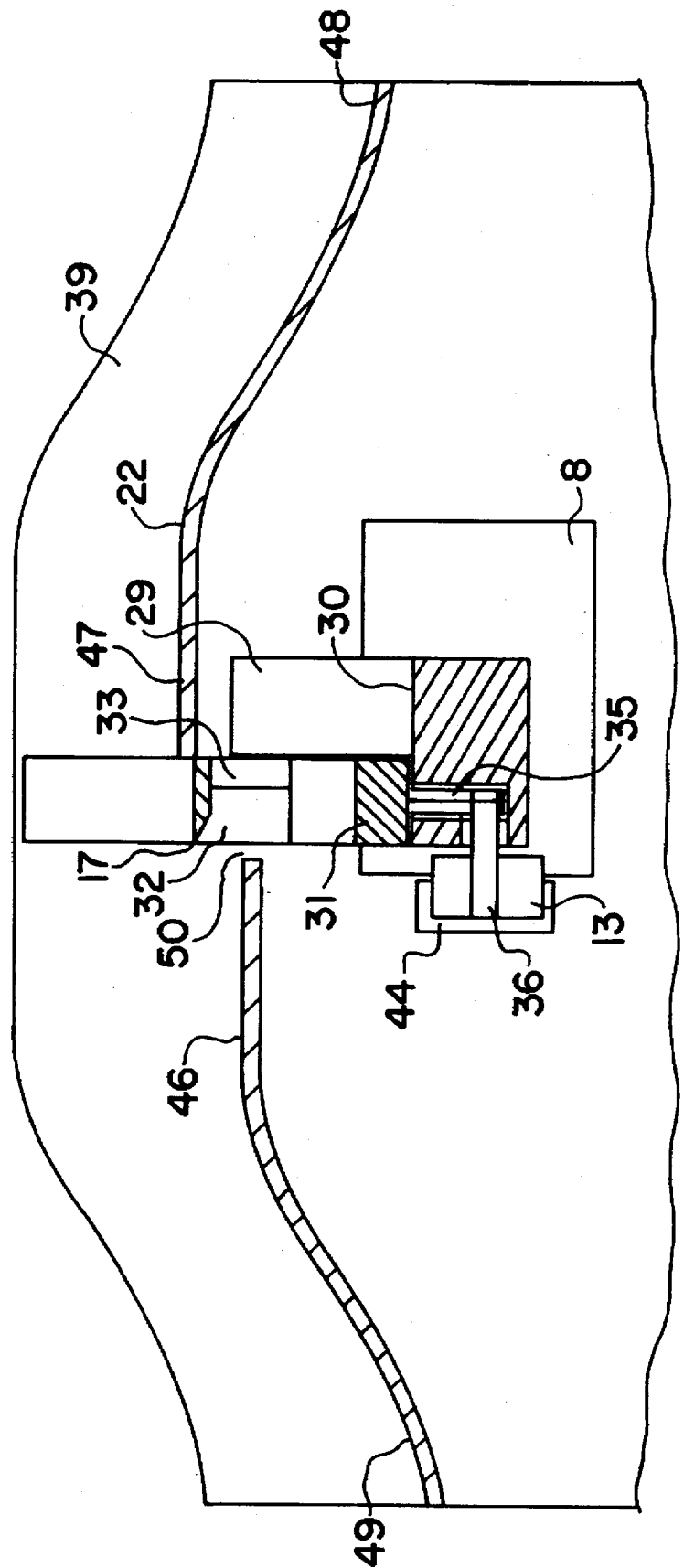
FIG. 4 a section along the line IV—IV of FIG. 3.

FIG. 4 shows a partial section along the line IV—IV of FIG. 3. FIG. 4 shows specifically that the knife 17, 31 is not only guided by the guide surface 30 but is guided also by the knife guide 29 against displacement in the cutting direction. Therefore, the knife guide 29 has a L-shaped cross section. The driver 35 protrudes into an opening in the knife guide. It is joined to the oscillating arm 13 by the wrist pin 36. Also, the section view of FIG. 4 shows more clearly the offset between the knife-edge 17 and the top side of the housing. The top side of the housing before the knife-edge 17 in moving direction of the fruit is offset relative to the knife-edge, which creates a gap 32 between the top side 46 of the housing and the knife-edge 17. The top view shows also a clearance 50 between the knife-edge 17 and the housing wall. The knife clearance is adjustable through vertical positioning of the knife. On the exit side for the sliced peels, that is behind the knife-edge 17, the top side 47 of the housing is offset against the top side 46 in such a way that the top side 47 is slightly higher than or at least level with the knife-edge 17. The purpose is to assure that the sliced peels fall only through the compartment 26 and do not remain on top of the work area 46, 47. This work area may be totally flat. It may also be slightly raised relative to the top of the housing as indicated by the slopes 48 and 49. Accordingly, the trough 39 that guides the fruit for peeling has a bump (46, 47) in moving direction of the fruit at the peeling location that tapers off afterwards.

Figure 5:
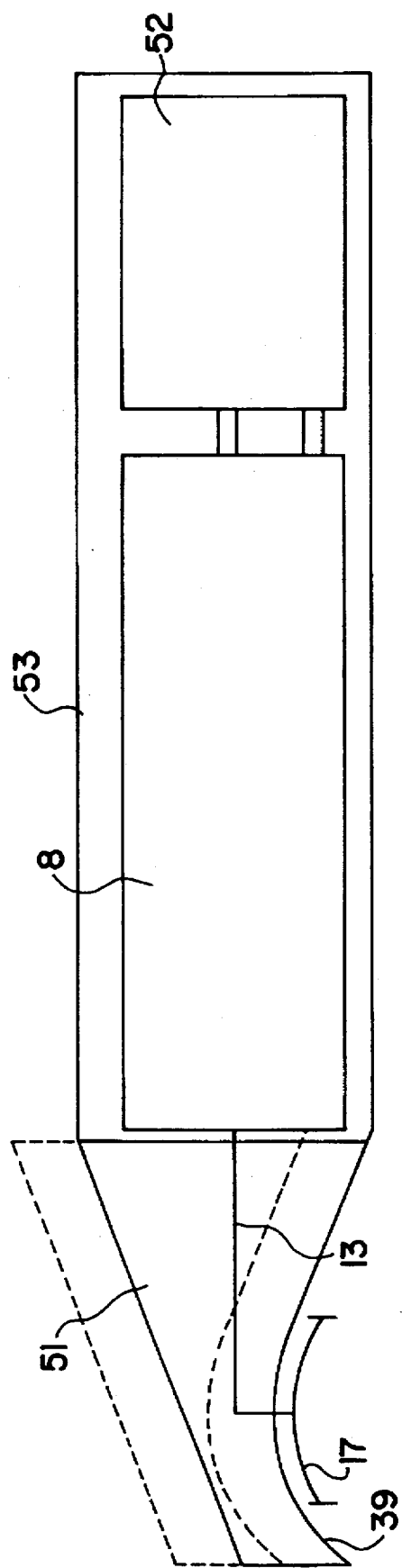
FIG. 5 a schematic side view of a peeling device representing a third design example of the invention.

FIG. 5 shows another design example of the invention featuring a hand-operated peeling device. The device has a housing 53 for a motor 8 and a battery 52. The housing may have a cylindric shape and be designed for easy hand-operation. The cutter head 51 contains the cutting unit including the knife-edge 17 and the oscillating arm 13 that is connected to the motor 8. Again, the housing has a trough 39 that reduces risk of injury and improves the guidance for the fruit to be peeled. The cutter head 51 is adjustable relative to the housing 53 as indicated by the dashed line.

This allows to adjust the peeling depth. Beyond that, the knife drive and knife guide match those of the design examples shown in FIG. 1 through 4, and the corresponding details were omitted in FIG. 5.

The peeling device of FIG. 5 is moved perpendicular to the longitudinal axis of the housing 53 for peeling, that is perpendicular to the projection plane of FIG. 5.

In addition, it is pointed out that the knife 17 of the design examples shown in FIG. 3 to 5 can also be a lineal design working with a linear motion. Accordingly, this example of the invention covers also basically two types of movement, that is a knife oscillation parallel to the knife-edge 17 or a second movement where the knife oscillates perpendicular to the knife-edge.

The expert realizes the potential for further design variations without difficulty. For example, adjustment of the peeling depth may be realized by lowering or raising the work areas 46 and 47 of FIG. 4 relative to the rest of the housing.

I claim:

1. A peeling device for fruits comprising:
   a support surface for supporting a fruit to be peeled, said support surface having a knife opening extending therethrough;
   a peeling knife projecting through the knife opening, said peeling knife having a knife edge projecting above said support surface to be moved along a surface of the fruit to peel the fruit;
   an oscillating arm disposed below said support surface and connected to said peeling knife; and
   a drive unit connected to said oscillating arm for oscillating said oscillating arm.

2. A peeling device according to claim 1, wherein the support surface has at least two planes disposed at an angle with respect to each other, the knife-edge having a shape matching the support surface.

3. A peeling device according to claim 1, wherein said oscillating arm is constructed and arranged to oscillate said peeling knife back and forth in a direction that is parallel to the knife edge.

4. A peeling device according to claim 1 or 3, further comprising a knife guide having a guide surface that is shaped like a circular segment, the peeling knife being shaped as a circular segment and being guided back and forth in a circular path by the knife guide.

5. A peeling device according to claim 4, wherein the peeling knife has a knife base that contacts the guide surface of the knife guide, and said peeling device further comprises bridges, the knife-edge being held at a distance to the knife base by the bridges, whereby a gap is created between the edge and the knife base.

6. A peeling device according to claim 3, wherein the knife guide has an L-shaped cross section with the knife base being supported by both legs of the L.

7. A peeling device according to claim 1, wherein the support surface is curved, and the knife-edge matches the shape of the support surface.

8. A peeling device according to one of claims 6 or 2, wherein the knife-edge is adjustable and offset relative to the support surface.

9. A peeling device according to claim 1, further comprising a housing compartment, the peeling knife being located in the housing compartment and said compartment having an opening below the peeling knife that allows sliced peels to fall through.

10. A peeling device according to claim 9, wherein the housing is C-shaped and the device further includes a base and a stand connecting said housing to said base in such a way that a collecting dish can be inserted between the base and the compartment.

11. A peeling device according to claim 1, wherein the oscillating arm is connected to the drive unit in a detachable manner.

12. A peeling device according to claim 1, further including a container and a housing in which the drive unit is disposed that is connected to a side of the container, a side wall of the container having an opening that allows the oscillating arm to reach through.

13. A peeling device according to claim 12, wherein the drive unit in the housing includes an elevation adjustment that comprises a worm gear operated with a thumb screw from outside of the housing.

14. A peeling device according to claim 1 further comprising a container comprising a bottom part and a top part having a housing for the drive unit.

15. A peeling device according to claim 14, wherein the housing is supported by a steady leg connected to the housing on a side opposite the container.

16. A peeling device according to claim 1, wherein said device is hand-held having a cylindrical housing and a cutter head that is adjustable relative to the housing and wherein the knife-edge and the oscillating arm are connected to the housing.

* * * * *